(No Model.)  2 Sheets—Sheet 1.
E. G. WOODWORTH.
SAW MILL DOG.
No. 327,637.  Patented Oct. 6, 1885.
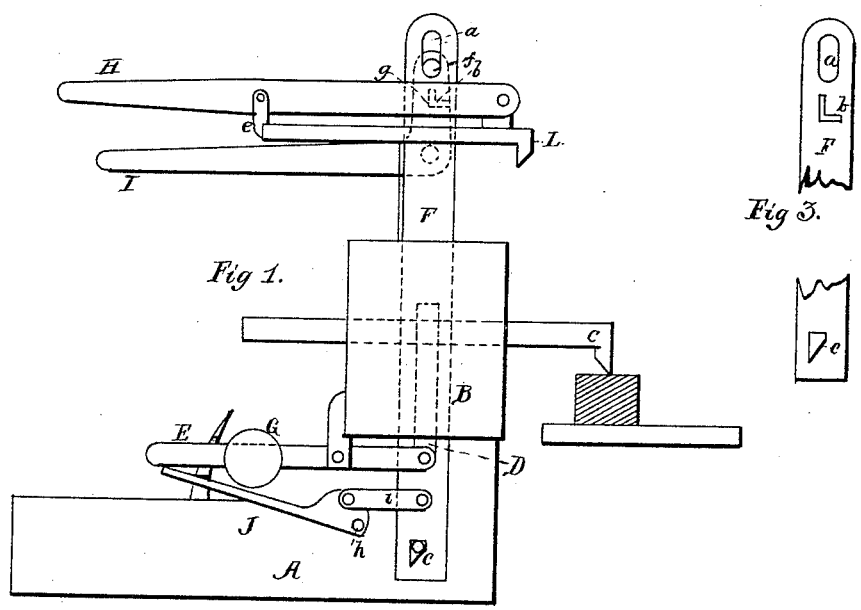
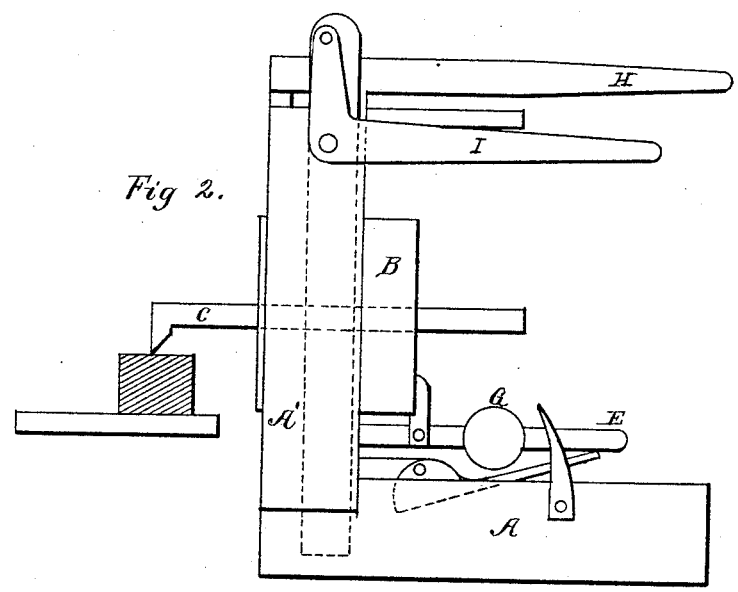
Witnesses:
C. S. Johnston
A. N. Swoger
Inventor.
Elew G. Woodworth
By A. C. Johnston
Atty (No Model.)  E. G. WOODWORTH.  2 Sheets—Sheet 2.
SAW MILL DOG.
No. 327,637.  Patented Oct. 6, 1885.
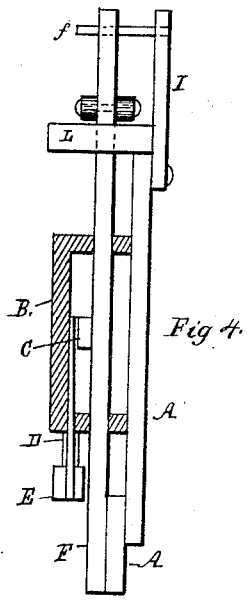
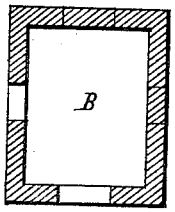
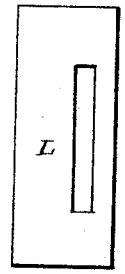
Witnesses:
C. S. Johnston
A. N. Swoger
Inventor.
Elon G. Woodworth
By A. C. Johnston
Atty

UNITED STATES PATENT OFFICE.

ELON G. WOODWORTH, OF ALLEGHENY, PENNSYLVANIA.

SAW-MILL DOG.

SPECIFICATION forming part of Letters Patent No. 327,637, dated October 6, 1885.

Application filed February 15, 1884. Serial No. 120,899. (No model.)

*To all whom it may concern:*

Be it known that I, ELON G. WOODWORTH, of Allegheny, in the county of Allegheny and State of Pennsylvania, have invented a new and useful Improvement in Clamping and Adjustable Dogs for Saw-Mills; and I do hereby declare that the following is a full, clear, and exact description thereof, reference being had to the accompanying drawings, and to the letters of reference marked thereon.

My invention relates to an improvement in clamping and adjustable dogs for saw-mills; and it consists, essentially, of a frame, dog-holder mounted upon a vertical and adjustable support, and a series of operating levers, combined, arranged, and operating in the manner hereinafter described.

To enable others skilled in the art with which my invention is most nearly connected to make and use it, I will proceed to describe its construction and operation.

In the accompanying drawings, which form part of my specification, Figures 1 and 2 are side elevations of my improvement. Fig. 3 is a detail view. Fig. 4 is an end elevation representing a vertical and tranverse section of the adjustable dog-holder. Fig. 5 is a vertical section of the same. Fig. 6 is a top view of the top-plate of the frame.

Reference being had to the drawings, A represents the frame of the clamping and adjusting dog; B, the adjustable dog-holder; C, the dog; E, a weighted lever, to the end of which is pivoted a wedge, D, which passes up between the dog C and the side wall of the dog-holder, for the purpose of clamping the dog C firmly in the holder B. The weight G on the lever E is adjustable for the purpose of bringing the desired force upon the wedge D in the operation of securing the dog C in the holder B. The holder B is placed upon a vertical and adjustable support, F, which is furnished with a series of slots or openings marked *a b c*, the offices of which will hereinafter appear, and said vertical support is operated through the medium of levers H I J.

The construction of the several parts herein mentioned and shown in the drawings will be readily understood by the skillful mechanic and sawyer. I will therefore proceed to describe its operation, which is as follows:

The clamping and adjusting dog, one or more of them, is secured in the desired position upon the carriage of the saw-mill, upon which carriage is placed the timber to be sawed in the usual manner. The sawyer adjusts the dog C in the holder B so that the catching-point of the dog will rest in the proper position upon the timber, as indicated in Figs. 1 and 2. The lever E and its weight G are then pressed down sufficiently to cause the wedge D to clamp the dog C firmly in the holder B. The sawyer then raises the lever H, which will force the catching-point of the dog C into the timber sufficiently to firmly hold the timber with relation to the saw, said lever holding the dog and its holder with relation to the timber through the medium of a pawl, *e*, pivoted to the lever, the lower end of said pawl catching upon the end of the top plate L. The slot *a* receives the pin *f* in the short limb of the lever I, which is pivoted to the upright A' of the frame A, which lever is employed for imparting to the vertical and adjustable support, at its upper end, a lateral motion for inclining the vertical plane of the timber to be sawed toward or from the saw, as may be desired. Said upper end of the vertical and adjustable support is held in the position desired through the medium of the pin *g* of the lever H, which passes through the slot or opening *b*.

In the operation of sawing timber, particularly boards, as the saw approaches midway between the two ends of the timber, there is a tendency, from some unexplained cause, for the timber to press toward the saw; hence it is that boards are often found to gradually increase in thickness between the two ends, causing a very perceptible increase in thickness of the board about midway of its length. The trained eye of the sawyer readily notices this increased thickening of the board in the operation of sawing, but heretofore has been powerless to prevent it; but through the medium of lever J, which is pivoted at *h* to the frame A, to which is pivoted a link, *i*, which is also pivoted to the vertical and adjustable support F, in combination with the slot or opening *c*, which opening at its lower side is inclined, as shown in Fig. 1, the sawyer may, by pressing on the end of lever J, so operate the vertical-adjustable support F, holder B, and dog C as to draw the timber from the saw to the degree desired when the sawyer discovers the tendency of the timber to hug the saw.

The advantages that may be derived by the use of the adjustable clamping-dog hereinbefore described will be apparent to the skillful sawyer without further description.

Having thus described my improvement, what I claim is—

1. The combination of the frame A, having top plate L, vertically and laterally adjustable support F, provided with slots $a\ b\ c$, adjustable holder B, sliding upon said adjustable support, dog C, carried by the head B, levers H and I, provided with pins $g$ and $f$, and pawl $e$, substantially as described.

2. The combination of the frame A, having top plate L, vertically and laterally adjustable support F, provided with slots $a\ b$ at its upper end and $c$ at its lower end, adjustable dog-holder B, sliding upon support F, dog C, lever H, attached to plate L and provided with pin $g$, lever I, attached to support F and having pin $f$, pawl $e$, attached to lever H and adapted to engage with plate L, wedge D in the holder B secured to lever E, and adjustable weight G, substantially as described.

3. The combination of the frame A, having top plate L, vertically and laterally adjustable support F, provided with slots $a\ b$ at its upper end and $c$ at its lower end, adjustable dog-holder B, dog C, wedge D in holder B and secured to lever E, lever H, attached to plate L and provided with pin $g$, lever I, attached to support F and having pin $f$, lever J, attached to frame A, and link $i$, secured to lever J and support F, substantially as described.

E. G. WOODWORTH.

Witnesses:
A. C. JOHNSTON,
C. S. JOHNSTON.